United States Patent Office 3,280,164
Patented Oct. 18, 1966

3,280,164
PRODUCTION OF MERCAPTO-SUBSTITUTED PROPIONITRILES
Rector P. Louthan, Bartlesville, Okla., assignor to Phillips Petroleum Company, a corporation of Delaware
No Drawing. Filed May 6, 1963, Ser. No. 278,444
2 Claims. (Cl. 260—465.1)

This invention relates to a process for preparing mercapto-substituted nitriles. In another aspect, it relates to an improved process for preparing 3-mercaptopropionitrile from acrylonitrile.

Organic sulfur compounds are of considerable industrial importance and processes for obtaining them in high yields by reaction of hydrogen sulfide with ethylenically unsaturated compounds are of considerable utility. Mercapto-substituted nitriles are one class of such organic sulfur compounds; for example, 3-mercaptopropionitrile can be hydrolyzed to form 3-mercaptopropionic acid, a compound which is useful in permanent wave solutions.

Various processes have been disclosed in the prior art for the preparation of mercapto-substituted nitriles, but many of these processes have proven unsatisfactory for one reason or another. The simple addition of hydrogen sulfide to unsaturated nitriles produces small yields of mercapto-substituted nitriles and a relatively larger quantity of the corresponding thioether (sulfide). If mild reaction conditions are used for the thiolation reaction, very long reaction times are required to produce even low yields of the mercapto-substituted nitrile.

A recent improved process for the production of mercapto-substituted nitriles is that disclosed in copending application Serial No. 278,401 filed by R. P. Louthan et al., which process comprises reacting a nitrile with hydrogen sulfide in the presence of a catalytic amount of sulfur, and recovering a mercapto-substituted nitrile product from the resulting reaction mixture. The amount of sulfur used is that sufficient to catalyze the reaction and increase the yield of the mercapto-substituted nitrile, and this amount is generally 0.1 to 5 grams per mole, preferably 0.5 to 2 grams per mole, of the nitrile charged to the reaction zone. The recovered mercapto-substituted nitrile is obtained in high yields and high purities, and is characterized as follows:

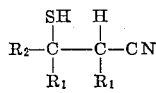

wherein $R_1$ and $R_2$ are identified hereinbelow.

The instant invention can be considered an improvement in the process of said copending application, and it comprises reacting a nitrile with hydrogen sulfide in the presence of an added amount of a material boiling above 100° C. at 5 mm. Hg absolute pressure, which material is that obtained upon reaction of the same or a different nitrile with hydrogen sulfide in the presence of sulfur. The process of this invention results in production of mercapto-substituted nitriles in even higher yields than that obtained according to the process of said copending application. By carrying out the process of said copending application, the mercapto-substituted nitrile product is separated from the reaction mixture, for example by distillation, leaving a material boiling above 100° C. at 5 mm. Hg absolute pressure, and it is this latter material (a "kettle product" where distillation is used to recover the desired mercapto-substituted nitrile) that can be used according to the instant invention to promote the reaction and increase the yield of the desired mercapto-substituted nitrile.

The nitriles which can be used in that reaction from which the material boiling above 100° C. at 5 mm. Hg absolute pressure is obtained, and the nitriles which are reacted with hydrogen sulfide in the presence of such material, according to the practice of this invention, can be represented by the general formula:

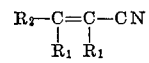

where:

each $R_1$ is selected from the group consisting of hydrogen and lower alkyl radicals, such as methyl, ethyl, propyl and butyl hydrocarbon radicals which are inert under the conditions of reaction, and $R_2$ is selected from the group consisting of said $R_1$ radicals and a cyano radical (—CN).

Representative nitriles which can be used as reactants in the practice of this invention include: acrylonitrile, 2-methylacrylonitrile, 2-butenenitrile, 3-methyl-3-butenenitrile, 2,3-dimethyl-2-butenenitrile, 2-hexenenitrile, 2-heptenenitrile, 4-methyl-2-hexenenitrile, 2-n-propyl-2-pentenenitrile, 3-methyl-2-pentenenitrile, 2,3-di-n-butyl-2-heptenenitrile, 2-butene-1,4-dinitrile, 2-methyl-2-butene-1,4-dinitrile, 2-ethyl-2-butene-1,4-dinitrile, 2,3-dimethyl-2-butene-1,4-dinitrile, 2-isopropyl-3-tert-butyl-2-butene-1,4-dinitrile, 2,3-di-n-butyl-2-butene-1,4-dinitrile, and the like, including mixtures thereof.

The process according to this invention can be carried out in a batch or continuous manner under anhydrous conditions. For example, the batch process can be carried out by preparing the initial batch of mercapto-substituted nitrile product by reacting a nitrile with hydrogen sulfide in the presence of a catalytic amount of sulfur and carrying out the reactions of subsequent batches by reacting a nitrile with hydrogen sulfide in the presence of a yield-promoting amount of the material boiling above 100° C. at 5 mm. Hg absolute which is obtained upon recovering the mercapto-substituted nitrile product from the preceding batch operation. As an example of a continuous process, the reaction of the nitrile with hydrogen sulfide can be initially carried out in the presence of a catalytic amount of sulfur and thereafter carried out in the presence of the material boiling above 100° C. at 5 mm. Hg absolute.

In both the reaction carried out in the presence of sulfur and the reaction carried out in the presence of the material boiling above 100° C. at 5 mm. Hg absolute, the reaction temperatures can very over a wide range, and generally will be in the range of 0 to 150° C., preferably 25 to 100° C. The amount of hydrogen sulfide used can vary widely, but generally will be in the range of 1 to 4 moles per mole, preferably about 2 moles per mole, of the nitrile reactant. The reaction can be carried out in a closed system and the pressure in the reaction zone generally will be the autogenous pressure developed at the specified temperatures, such pressures being in the range of 100 to 1,000 p.s.i.g. The reaction time can also vary; generally the reaction time will be in the range of 0.1 to 20 hours, usually 0.25 to 5 hours.

The above described reactions of hydrogen sulfide with the nitrile compounds can be carried out in the presence of solvents or diluents, preferably polar organic diluents such as alcohols, amides, sulfoxides, sulfones and saturated nitriles. For example, diluents such as methyl alcohol, ethyl alcohol, dimethylsulfoxide, sulfolane and acetonitrile can be used. Where such diluents are employed, the weight ratio of diluent to nitrile reactant will generally not be greater than 3/1.

After reaction is completed to the desired degree, the mercapto-substituted nitrile products can be recovered from the reaction mixture by well-known procedures. For example, gases can be vented, recovered and recycled if desired, and the product distilled, extracted, crystallized or subjected to various other separation or recovery procedures to obtain the desired sulfur compound. In the usual recovery process, the reaction mixture will be flashed, the vaporized mercapto-substituted nitrile condensed, and the condensed product distilled to obtain the highly pure mercapto-substituted nitrile in high yields. In the recovery process, the material boiling above 100° C. at 5 mm. Hg absolute pressure is also obtained, in addition to said mercapto-substituted nitrile product. As mentioned above, this material can be used in the process of this invention to increase the yield of the desired mercapto-substituted nitrile product.

The amount of said material boiling above 100° C. at 5 mm. Hg absolute which is used in the practice of this invention is, stated functionally, an amount sufficient to increase the yield of the mercapto-substituted nitrile. Generally, the amount of said material used will be in the range from 10 to 75 grams per mole of the nitrile charged to the reaction zone.

In the preferred embodiment of this invention, the nitrile used in that reaction in which said material boiling above 100° C. at 5 mm. Hg absolute is obtained is the same nitrile as that employed according to the instant invention for the reaction of the nitrile with hydrogen sulfide in the presence of said material boiling above 100° C. at 5 mm. Hg absolute. Further, I prefer to carry out the process of my invention in a batch manner. The initial batch operation comprises reacting the nitrile with hydrogen sulfide in the presence of a catalytic amount of sulfur, separating and recovering the mercapto-substituted nitrile product and said material boiling above 100° C. at 5 mm. Hg absolute and the subsequent batch operations comprise reacting the nitrile with hydrogen sulfide in the presence of a sufficient amount of said material boiling above 100° C. at 5 mm. Hg absolute obtained from a preceding batch operation. The batch operation can be repeated until such time as the yield-increasing activity of said material boiling above 100° C. at 5 mm. Hg absolute declines, after which the operation can be repeated, starting initially with the batch operation in which the nitrile is reacted with hydrogen sulfide in the presence of a catalytic amount of sulfur.

The following examples further illustrate the objects and advantages of this invention, but it should be understood that the various reactants, amounts, temperatures, and other conditions recited in these examples should not be construed so as to unduly limit this invention.

EXAMPLE I

A series of batch runs was carried out in which acrylonitrile was reacted with hydrogen sulfide in the presence or absence of various materials.

In each of these runs, 12 moles of acrylonitrile and, where used, various amounts of sulfur and/or material boiling above 100° C. at 5 mm. Hg absolute, were charged to a 1-gal. stainless steel stirred autoclave equipped with an internal steam coil and water jacket for maintaining the reaction temperature at the desired level. The reactor was then closed and pressured with the desired amount of hydrogen sulfide, after which the reaction mixture was heated to such temperatures for various reaction periods. In all of the runs, samples were withdrawn from the reaction mixture every 30 min. and analyzed for unreacted acrylonitrile by chromatographic analysis. The reaction in each run was continued until all of the acrylonitrile had been reacted. Thus, each run was carried out to completion and the reaction time recorded was the reaction time to completion. In each of the runs, the reaction mixture was blown down hot from the autoclave and the resulting 3-mercaptopropionitrile was flashed from the hot mixture. The flashed product was condensed and distilled. A typical sample of the distilled 3-mercaptopropionitrile boiled at 75° C. at 5 mm. Hg absolute pressure and had a refractive index of $n_D^{20}$ of 1.4866. These runs and results are summarized in Table I.

*Table 1*

| Run | Mol ratio of $H_2S$ to acrylonitrile | Additive, gms. per mol of acrylonitrile | | Amt. of kettle product used from preceding run, wt. percent | Reaction temp., °C. | Reaction time, hrs. | Yield [b] of mercapto-substituted nitrile, mol percent |
|---|---|---|---|---|---|---|---|
| | | Sulfur | Kettle product [a] | | | | |
| 1 | 2/1 | 0 | 0 | | 85 | 2 | [c] 0 |
| 2 | 2/1 | 2 | 0 | | 85 | 2 | 53.7 |
| 3 | 2/1 | 0 | 32.6 | 100 | 85 | 1 | 70.5 |
| 4 | 2/1 | 0 | 53.0 | 100 | 85 | 0.5 | 71.5 |
| 5 | 2/1 | 0 | 53.0 | 72 | 40–60 | 0.5 | 72.8 |
| 6 | 4/1 | 0 | 53.0 | 74.8 | 85 | 1 | 64.3 |
| 7 | 2/1 | 1 | 53.0 | 81.3 | 85 | 1 | 57.4 |

[a] Kettle product used in each run was that obtained from the preceding run and boiled above 100° C. at 5 m.m. Hg abs. (e.g., the kettle product used in run 3 was that obtained from run 2).
[b] Yield based on acrylonitrile charged.
[c] In this control run, 82.3% of acrylonitrile was recovered unreacted. Some high-boiling material was formed, but no 3-mercaptopropionitrile was found.

The data of Table I show that significantly higher yields of the desired mercapto-substituted nitrile are obtained when the reaction is carried out in the presence of the kettle product obtained in a preceding run. Run No. 6 indicates some decline in the yield-promoting activity of the kettle product used, and run 7 shows that the decline is not apparently reversed when the reaction is carried out in the presence of an added amount of sulfur in addition to the kettle product.

EXAMPLE II

The procedure of Example I was repeated in another series of batch runs, in which acrylonitrile was reacted with hydrogen sulfide in the presence of sulfur or other additives. One of said other additives was that used according to the instant invention, viz., the material boiling above 100° C. obtained from the reaction of acrylonitrile with hydrogen sulfide in the presence of a catalytic amount of sulfur. In another run, the additive used was thiobis(propionitrile), which is produced by reacting 2 moles of acrylonitrile with 1 mole of hydrogen sulfide. And in another run, poly(3-mercaptopropionitrile) was used as the additive, this additive being the thick viscous material of reddish color which results upon degradation of 3-mercaptopropionitrile when the latter is stored at room temperature in the absence of a stabilizer. Results of this series of runs are set forth in Table II.

where each $R_1$ is selected from the group consisting of hydrogen and lower alkyl radicals, and $R_2$ is selected from the group consisting of said $R_1$ radicals and —CN and said kettle product consisting of a bottoms product boiling above 100° C. at 5 mm. Hg absolute pressure, formed in the reaction of said nitrile with hydrogen sulfide in the presence of sulfur and from which any mercapto-

*Table II*

| Run | Mol ratio of H₂S to acrylonitrile | Amt. of S per mol of acrylonitrile, gm. | Other additive | Amt. of other additive, gms. per mol of acrylonitrile | Reaction temp., ° C. | Reaction time, hrs. | Yield [b] of mercapto-substituted nitrile, mol Percent |
|---|---|---|---|---|---|---|---|
| 1 | 2/1 | 1 | None | | 85 | 2 | 54.2 |
| 2 | 2/1 | 0 | 100% of kettle product [a] from Run 1 | 31.0 | 85 | 1 | 65.7 |
| 3 | 2/1 | 0 | Thiobis(propionitrile) | 30.0 | 85 | 4 | 32.6 |
| 4 | 2/1 | 0 | Poly(3-mercaptopropionitrile) | 210 | 85 | 0.5 | 15.9 |

[a] Kettle product boiled above 100° C. at 5 mm. Hg abs.
[b] Yield based on acrylonitrile charged.

The data of Table II show that a significant increase in yield of the desired mercapto-substituted propionitrile is obtained when the reaction of acrylonitrile with hydrogen sulfide is carried out in the presence of said kettle product boiling above 100° C. The data also show that additives similar to the mercapto-substituted propionitrile product do not increase the yield of the desired product.

Various modifications and alterations of this invention will become apparent to those skilled in the art from the foregoing description and examples without departing from the scope and spirit of this invention, and it should be understood that this invention is not to be limited to that set forth herein for illustrative purposes.

I claim:
1. A process for preparing a mercapto-substituted nitrile having the following structure:

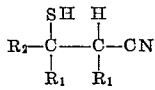

which comprises reacting at autogenous pressures, at a temperature in the range of 0–150° C., hydrogen sulfide with a nitrile, wherein the amount of hydrogen sulfide ranges from 1 to 4 mols per mol of the nitrile reactant in the presence of an amount of kettle product sufficient to catalyze said reaction, said nitrile having the general formula:

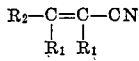

substituted nitrile having the following structure:

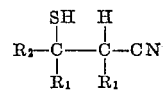

formed therein has been previously removed therefrom; and recovering the aforesaid mercapto-substituted nitrile as a product.

2. A process for preparing 3-mercaptopropionitrile, which comprises reacting, at autogenous pressure and at a range from 0 to 150° C., 1 mol of acrylonitrile with 2 mols of hydrogen sulfide in the presence of 32.6–53 grams/mol of acrylonitrile charged to the reaction mixture, of a kettle product consisting of a bottoms product boiling above 100° C. at 5 mm. Hg absolute pressure formed in the reaction of acrylonitrile with hydrogen sulfide in the presence of sulfur and from which any 3-mercaptopropionitrile formed therein has been previously removed; and recovering 3-mercaptopropionitrile as a product of said process.

References Cited by the Examiner
UNITED STATES PATENTS
2,163,176   6/1939   Keyssner ———————— 260—465

CHARLES B. PARKER, *Primary Examiner.*

JOSEPH P. BRUST, *Assistant Examiner.*